US012526655B2

(12) United States Patent
Behunin et al.

(10) Patent No.: US 12,526,655 B2
(45) Date of Patent: Jan. 13, 2026

(54) MANAGING BANDWIDTH CONSUMPTION ASSOCIATED WITH MULTIPLE INTERACTION CHANNELS OF A WIRELESS TELECOMMUNICATION NETWORK RELATED TO INFORMATION CAMPAIGNS

(71) Applicant: T-Mobile USA, Inc., Bellevue, WA (US)

(72) Inventors: Brian John Behunin, Snohomish, WA (US); Joshua Conley, Auburn, WA (US); Kirtikumar Dhanabalan, Bellevue, WA (US); Joohyung Kim, Seattle, WA (US); Sharan Sai Kumar, Lynnwood, WA (US); Nishant Makhija, Snohomish, WA (US); Fnu Neha, Sammamish, WA (US); Eugene Shulga, Bothell, WA (US); Dhrishya Subramanian, Seattle, WA (US); Qianwen Wen, Herndon, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 374 days.

(21) Appl. No.: 18/349,857

(22) Filed: Jul. 10, 2023

(65) Prior Publication Data

US 2025/0024272 A1 Jan. 16, 2025

(51) Int. Cl.
*H04W 24/02* (2009.01)
*H04W 24/08* (2009.01)

(52) U.S. Cl.
CPC ........... *H04W 24/02* (2013.01); *H04W 24/08* (2013.01)

(58) Field of Classification Search
CPC ............................ H04W 24/02; H04W 24/08
USPC ......................................................... 370/235
See application file for complete search history.

(56) References Cited

U.S. PATENT DOCUMENTS

| 7,826,426 | B1 | 11/2010 | Bharghavan et al. |
| 8,369,305 | B2 | 2/2013 | Diener et al. |
| 8,374,592 | B2 | 2/2013 | Proctor et al. |
| 8,665,785 | B2 | 3/2014 | Beck et al. |

(Continued)

FOREIGN PATENT DOCUMENTS

| CN | 102365637 A | 2/2012 |
| CN | 107273944 A | 10/2017 |

(Continued)

*Primary Examiner* — Hermon Asres
(74) *Attorney, Agent, or Firm* — Perkins Coie LLP

(57) ABSTRACT

The system creates a first group including a first multiplicity of UEs and a second group including a second multiplicity of UEs. The system provides an information campaign to the first group and prevents the second group from being exposed to the information campaign. The system obtains a first parameters across multiple interaction channels associated with a network and a second parameters across the multiple interaction channels associated with the network. The system determines a difference between the first multiplicity of indications associated with the first group and the second multiplicity of indications associated with the second group. Based on the difference, the system predicts bandwidth consumption in multiple interaction channels of the network upon releasing the information campaign to other UEs operating on the network.

20 Claims, 6 Drawing Sheets

(56) References Cited

U.S. PATENT DOCUMENTS

| | | | |
|---|---|---|---|
| 9,231,962 B1 | 1/2016 | Yen et al. | |
| 9,444,948 B1 | 9/2016 | Ren et al. | |
| 9,467,339 B2 | 10/2016 | Xiao et al. | |
| 9,660,862 B2 | 5/2017 | Ko et al. | |
| 9,699,502 B1 | 7/2017 | Sandholm et al. | |
| 10,171,857 B2 | 1/2019 | Ren et al. | |
| 10,455,402 B2 | 10/2019 | Prabdial et al. | |
| 10,482,494 B2 | 11/2019 | Schafer et al. | |
| 10,602,305 B2 | 3/2020 | Mckay | |
| 10,721,319 B1 | 7/2020 | Habiger et al. | |
| 10,817,912 B2 | 10/2020 | Vukich et al. | |
| 10,997,609 B1 | 5/2021 | Wang et al. | |
| 11,127,032 B2 | 9/2021 | Thimmaiah et al. | |
| 11,134,359 B2 | 9/2021 | Liang et al. | |
| 11,227,306 B2 | 1/2022 | Haberman et al. | |
| 11,587,011 B1 | 2/2023 | Behringer et al. | |
| 11,617,093 B1 | 3/2023 | Artuso | |
| 2006/0077957 A1 | 4/2006 | Reddy et al. | |
| 2008/0086741 A1 | 4/2008 | Feldman et al. | |
| 2009/0254413 A1 | 10/2009 | Chang et al. | |
| 2011/0153645 A1 | 6/2011 | Hoover et al. | |
| 2013/0046599 A1 | 2/2013 | Coppinger | |
| 2013/0103413 A1 | 4/2013 | Meralli | |
| 2013/0325587 A1 | 12/2013 | Kothari et al. | |
| 2014/0177579 A1 | 6/2014 | Beck et al. | |
| 2014/0344050 A1 | 11/2014 | Mckinley et al. | |
| 2016/0027048 A1 | 1/2016 | Ma et al. | |
| 2016/0048869 A1 | 2/2016 | Shim et al. | |
| 2016/0267522 A1* | 9/2016 | Schellenberger | G06Q 30/0246 |
| 2017/0238240 A1* | 8/2017 | Gunasekara | H04W 64/00 370/338 |
| 2022/0342990 A1* | 10/2022 | Zhang | G06F 21/562 |

FOREIGN PATENT DOCUMENTS

| | | |
|---|---|---|
| CN | 109891975 A | 6/2019 |
| CN | 111932262 B | 1/2021 |
| CN | 112204600 A | 1/2021 |
| CN | 112204914 A | 1/2021 |
| DE | 112015005186 T5 | 8/2017 |
| DE | 202017103591 U1 | 10/2017 |
| DE | 102017113281 A1 | 12/2017 |
| DE | 112017002533 T5 | 3/2019 |
| EP | 1797703 A2 | 6/2007 |
| EP | 3281300 A1 | 2/2018 |
| EP | 2615801 B1 | 8/2018 |
| EP | 3776434 A1 | 2/2021 |
| JP | 2010277360 A | 12/2010 |
| JP | 6595916 B2 | 10/2019 |
| JP | 7005499 B2 | 1/2022 |
| KR | 100605248 B1 | 7/2006 |
| KR | 101363594 B1 | 2/2014 |
| KR | 20150035754 A | 4/2015 |
| KR | 20160088325 A | 7/2016 |
| KR | 20180097555 A | 8/2018 |
| KR | 20190068609 A | 6/2019 |
| KR | 20210014661 A | 2/2021 |
| KR | 20210063424 A | 6/2021 |
| WO | 2006042139 A2 | 4/2006 |
| WO | 2008045899 A1 | 4/2008 |
| WO | 2011031322 A1 | 3/2011 |
| WO | 2011079085 A1 | 6/2011 |
| WO | 2013056376 A1 | 4/2013 |
| WO | 2014186735 A1 | 11/2014 |
| WO | 2014193994 A2 | 12/2014 |
| WO | 2016011659 A1 | 1/2016 |
| WO | 2017149374 A1 | 9/2017 |
| WO | 2018057501 A1 | 3/2018 |
| WO | 2020123421 A2 | 6/2020 |
| WO | 2020247451 A1 | 12/2020 |
| WO | 2021133997 A1 | 7/2021 |

\* cited by examiner

MANAGING BANDWIDTH CONSUMPTION ASSOCIATED WITH MULTIPLE INTERACTION CHANNELS OF A WIRELESS TELECOMMUNICATION NETWORK RELATED TO INFORMATION CAMPAIGNS

BACKGROUND

Introducing a new feature in various communication channels associated with a wireless telecommunication network can change behavior of mobile devices operating on the wireless telecommunication network. Further, the new feature can change interaction patterns with the wireless telecommunication network over various interaction channels, which in turn can affect bandwidth consumption on the wireless telecommunication network. Anticipating the changing interaction patterns is beneficial to management of the wireless telecommunication network.

BRIEF DESCRIPTION OF THE DRAWINGS

Detailed descriptions of implementations of the present invention will be described and explained through the use of the accompanying drawings.

Figure 1:
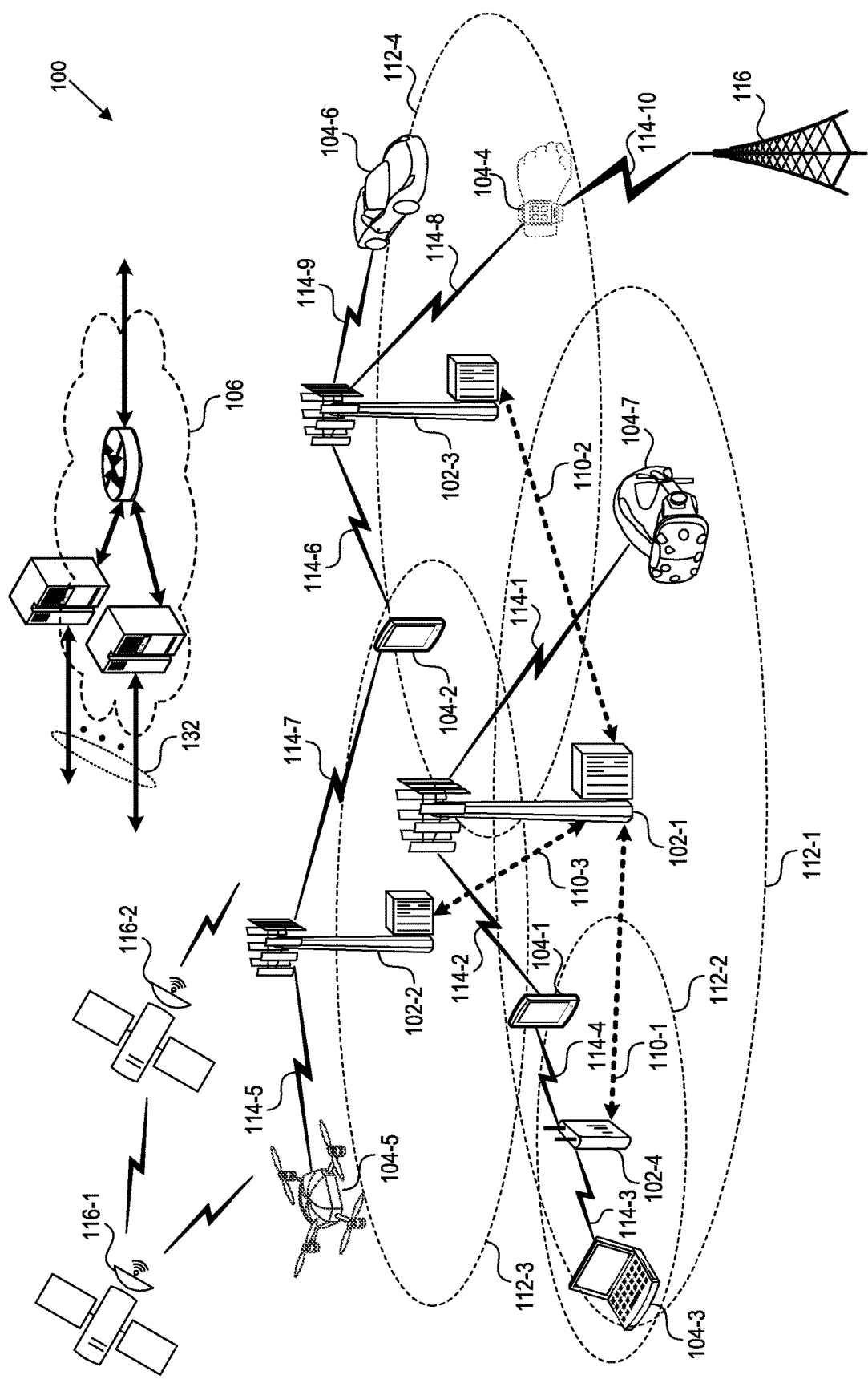
FIG. 1 is a block diagram that illustrates a wireless telecommunication network ("network") in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to predict and/or manage bandwidth consumption associated with multiple interaction channels of a wireless telecommunication network upon releasing an information campaign, such as a campaign associated with the wireless telecommunication network. The information campaign can relate to adding a new feature to a channel such as to a website. The new feature can include an answer about how to solve a technical issue with a particular mobile device model, a promotion for a new mobile device, or a promotion for a new plan associated with the wireless telecommunication network.

The system creates a group A of mobile devices associated with the wireless telecommunication network, and a group B of different mobile devices associated with the wireless telecommunication network. The groups A and B are each a subset of multiple mobile devices operating on the wireless telecommunication network.

The system provides the information campaign associated with the wireless telecommunication network to group A, and prevents group B from being exposed to the information campaign associated with the wireless telecommunication network. The system obtains a multiplicity A of parameters, e.g., indications of bandwidth consumption, across the multiple interaction channels associated with the wireless telecommunication network for group A, and, and similarly a multiplicity B of parameters for group B.

The system determines, e.g., a difference between multiplicity A of indications of bandwidth consumption associated with group A and multiplicity B of indications of bandwidth consumption associated with group B. Based on the difference, the system can manage operations of the wireless telecommunication network, e.g., predicting bandwidth consumption associated with multiple interaction channels of the wireless telecommunication network upon releasing the information campaign to the multiple mobile devices operating on the wireless telecommunication network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNB" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits-per-second data transmission in the era of 6G and beyond, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

Figure 2:
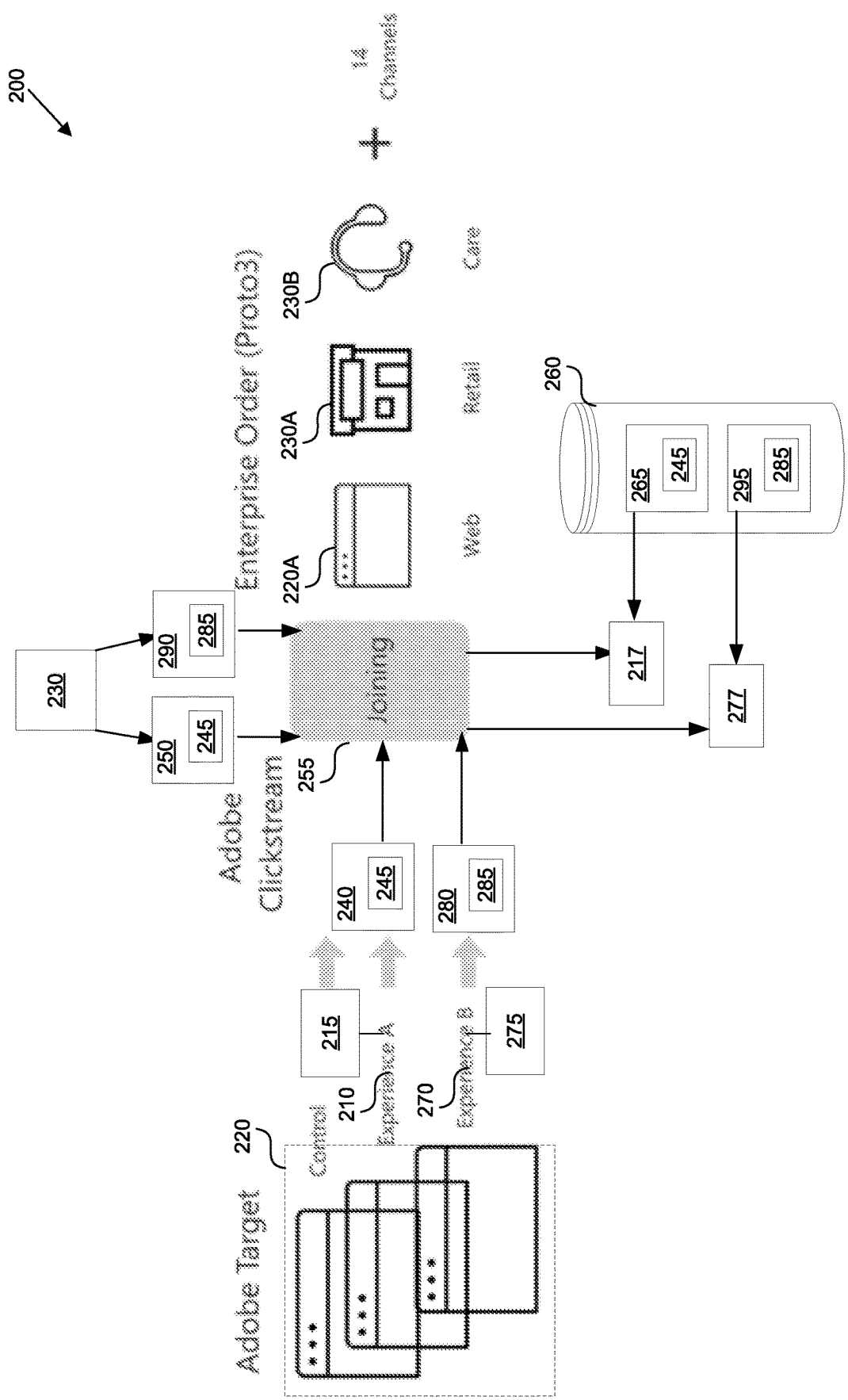
FIG. 2 shows a system to predict bandwidth consumption associated with multiple interaction channels of a wireless telecommunication network upon releasing an information campaign associated with the wireless telecommunication network.

Predicting Bandwidth Consumption Associated with Multiple Interaction Channels of a Wireless Telecommunication Network Upon Releasing an Information Campaign Associated with the Wireless Telecommunication Network FIG. 2 shows a system to predict bandwidth consumption associated with multiple interaction channels of a wireless telecommunication network upon releasing an information campaign associated with the wireless telecommunication network. The system 200 can present the information campaign 210 to a subset 215 of UEs operating on the network 100 in FIG. 1. The system 200 can measure the bandwidth A consumed by the subset 215 of the UEs that have received information campaign 210 across different interaction channels 220, 230. In addition to presenting the information campaign 210 to a subset 215 of the UEs, the system 200 can present information 270 without the information campaign 210 to a different subset 275 of UEs. The system 200 can measure bandwidth B consumed by the subset 275 of the UEs that have seen information 270 without information campaign 210 across different interaction channels 220, 230, and can compare bandwidth A and bandwidth B.

The new information campaign 210 can add a new feature to a channel such as a website. The new feature can include an answer about how to solve a technical issue with a particular UE model, a promotion for a new UE, a promotion for a new plan associated with the network 100, etc. The system 200 can analyze the impact of adding the new feature across the different interaction channels 220, 230. The impact can include determining bandwidth usage expected after introducing the information campaign 210 to all the UEs operating on the network 100, or to significantly more UEs than just the subset 215.

The interaction channel 220 can be digital such as web 220A, software applications, Internet chat, etc. The interaction channel 230 can be analog and can include retail 230A, interactive voice response (IVR), a telephone conversation 230B, etc.

The system 200 can obtain data from the digital interaction channel 220 using Adobe clickstream. The data can include multiple interactions 240 between the subset 215 of the UEs and the digital interaction channel 220. The multiple interactions 240 can include information about digital interactions such as browsing a page, selecting a user interface element in the software application, selecting a user interface element on a website, interactions over chat, interactions with a conversational artificial intelligence (AI), etc. In addition, the multiple interactions 240 can include a unique identifier (ID) 245 associated with the UE involved in the interaction. The unique ID 245 can be a billing account number (BAN) associated with the UE.

The system 200 can obtain data from the analog channel 230, where the data includes multiple analog interactions 250 such as visiting a store, calling a number associated with the network 100, calling a service representative, engaging in telesales, etc. The multiple interactions 250 can also include the unique ID 245, such as the BAN associated with the UE.

In step 255, the system 200 can join the multiple interactions 240, 250 and can relate the multiple interactions using the unique ID 245. The system 200 can obtain data 265 regarding a desired transaction, e.g., a sale, from a database 260. The data 265 can also include the unique ID 245. The system 200 can correlate the multiple interactions 240, 250 and the data 265 based on the unique ID 245. In addition, the system 200 can measure the bandwidth 217 consumed by the subset 215 of the UEs that have seen the information campaign 210 across different interaction channels 220, 230.

In addition to presenting the information campaign 210 to a subset 215 of the UEs, the system 200 can present information 270 without the information campaign 210 to a different subset 275 of UEs. The system 200 can measure the bandwidth consumed by the subset 275 of the UEs that have seen information 270 without the information campaign 210 across different interaction channels 220, 230.

Similarly to obtaining data associated with the subset 215 of the UEs, the system 200 can obtain multiple interactions 280 between the subset 275 of the UEs and the digital interaction channel 220. The multiple interactions 280 can include information about digital interactions such as browsing a page, selecting a user interface element in the software application, selecting a user interface element on a website, interactions over chat, interactions with a conversational AI, etc. In addition, the multiple interactions 280 can include a unique ID 285 associated with the UE involved in the interaction. The unique ID 285 can be a BAN associated with the UE.

The system 200 can obtain data from the analog channel 230, where the data includes multiple analog interactions 290 such as visiting a store, calling a number associated with the network 100, calling a service representative, etc. The multiple interactions 290 can also include the unique ID 285, such as the BAN associated with the UE.

In step 255, the system 200 can join the multiple interactions 280, 290 and can relate the multiple interactions using the unique ID 285. The system 200 can obtain data 295 regarding a desired transaction, e.g., a sale, from a database 260. The data 295 can also include the unique ID 285. The system 200 can correlate the multiple interactions 280, 290 and the data 295 based on the unique ID 285. In addition, the system 200 can measure the bandwidth 277 consumed by the subset 275 of the UEs that have seen the information campaign 210 across different interaction channels 220, 230.

The system 200 can compare the bandwidth consumed by the subset 215 of the UEs and the bandwidth consumed by the subset 275 of the UEs. In addition, the system 200 can compare the number of desired transactions performed by the subset 215 of the UEs, and the number of desired transactions performed by the subset 275 of the UEs. Based on the comparison, the system 200 can predict bandwidth consumption when the information campaign 210 is released to more UEs. Similarly, based on the comparison, the system 200 can predict the number of desired transactions when the information campaign 210 is released to additional UEs.

For example, if the subset 215 of the UEs engage in fewer desired transactions, the system 200 can predict that the number of the desired transactions will decrease by a certain amount when the information campaign 210 is released to additional UEs. Similarly, if the subset 215 of the UEs engage in more desired transactions, the system 200 can predict that the number of the desired transactions will increase by a certain amount when the information campaign 210 is released to additional UEs. The amount of change can be determined based on the amount of change between the subset 215 of the UEs and the subset 275 of the UEs. Similarly, the predicted bandwidth consumption can be adjusted based on the difference between the bandwidth consumption 217 and the bandwidth consumption 277.

In one embodiment, the system can determine the effect of the information campaign 210, without presenting the information campaign 210 to the subset 215 of the UEs. Instead, the system 200 can simulate the behavior of the subset 215 of the UEs based on data about the previous behavior of the subset 215 of the UEs. Based on the simulation, the system 200 can generate multiple interactions 240, 250, as well as data 265 regarding desired transactions. In effect, the system 200 can simulate the behavior of prospective users.

Figure 3:
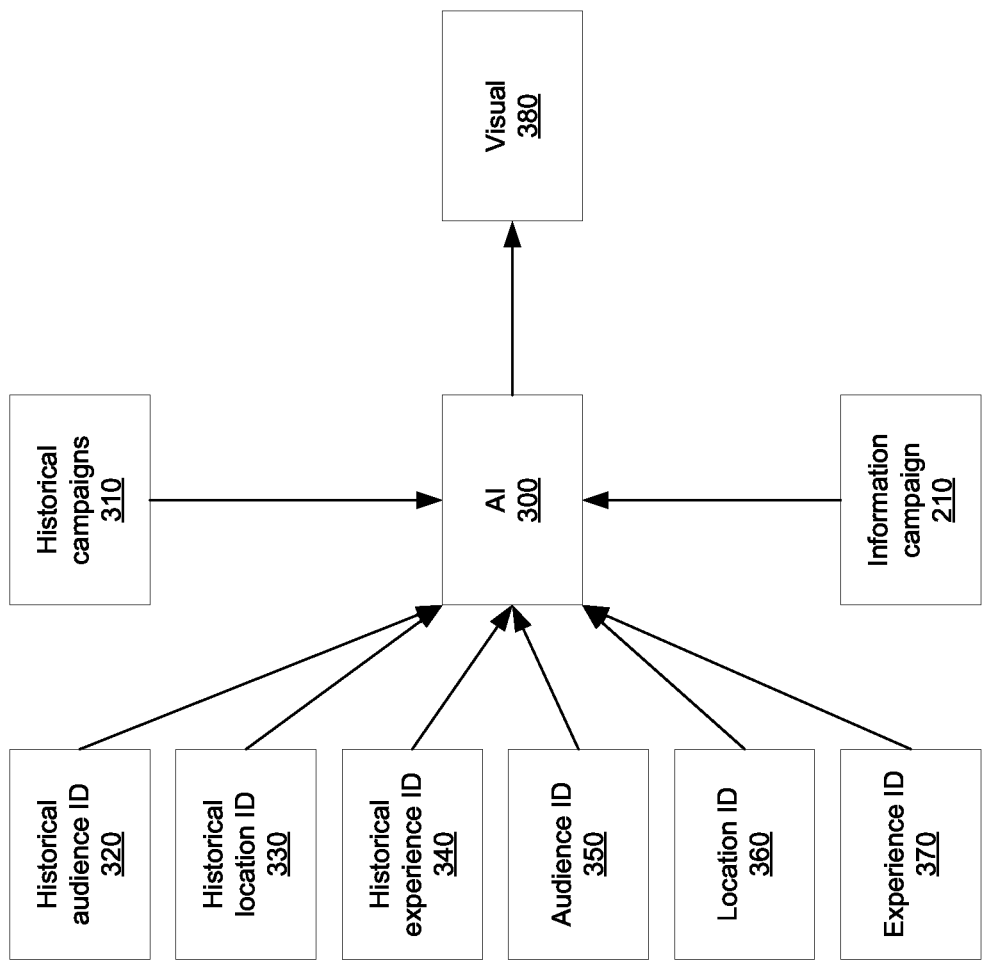
FIG. 3 illustrates the use of artificial intelligence to generate a visual for the information campaign.

FIG. 3 illustrates the use of artificial intelligence to generate a visual for the information campaign 210. The AI 300 can obtain multiple historical campaigns 310 and their corresponding historical audience ID 320, historical location ID 330, and historical experience ID 340. The AI 300 can also obtain an audience ID 350, a location ID 360, and an experience ID 370 associated with the information campaign 210.

The location ID indicates a geographic location associated with a mobile device participating in the information campaign. The historical audience ID includes information about the mobile device participating in the information campaign, a tenure of the mobile device on the wireless telecommunication network, or demographic information associated with a user of the mobile device participating in the information campaign. The experience ID indicates a successful historical audience ID for which the historical information campaign was successful.

The AI 300, based on the multiple historical campaigns 310, the historical audience ID 320, the historical location ID 330, the historical experience ID 340, the information campaign 210, the audience ID 350, the location ID 360, and the experience ID 370, can generate a visual 380 to include in the information campaign 210. The visual 380 can include images and or text that can, for example, appeal to the particular audience ID 350.

Figure 4:
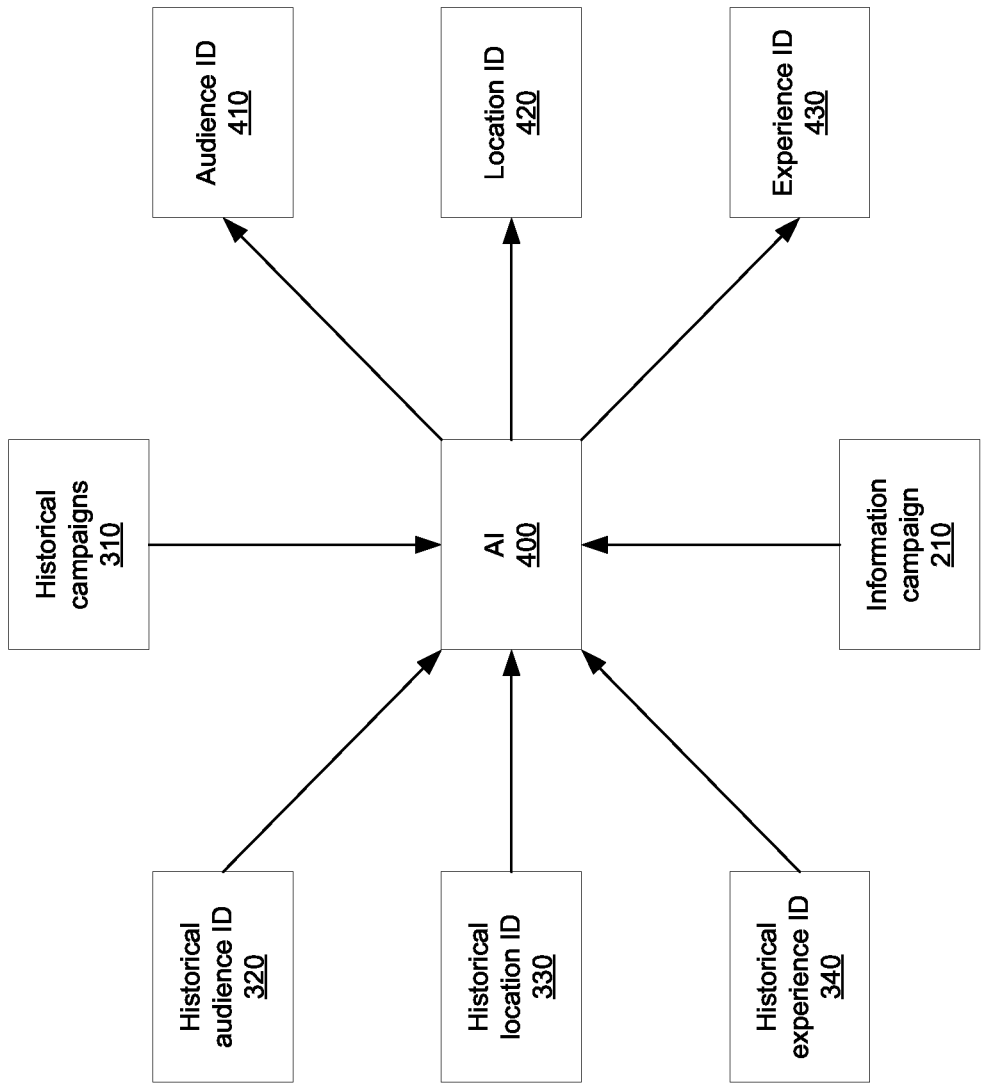
FIG. 4 illustrates the use of artificial intelligence to predict the audience ID, experience ID, and location ID for the information campaign.

FIG. 4 illustrates the use of artificial intelligence to predict the audience ID, experience ID, and location ID for the information campaign 210. The AI 400 can obtain multiple historical campaigns 310 and their corresponding historical audience ID 320, historical location ID 330, and historical experience ID 340. The AI 400 can obtain an indication of the information campaign 210 in FIG. 2. Based on the information campaign 210, multiple historical campaigns 310 and their corresponding historical audience ID 320, historical location ID 330, historical experience ID 340, and the information campaign 210, the AI 400 can predict the audience ID 410, the location ID 420, and the experience ID 430 that are the best match for the information campaign 210.

Figure 5:
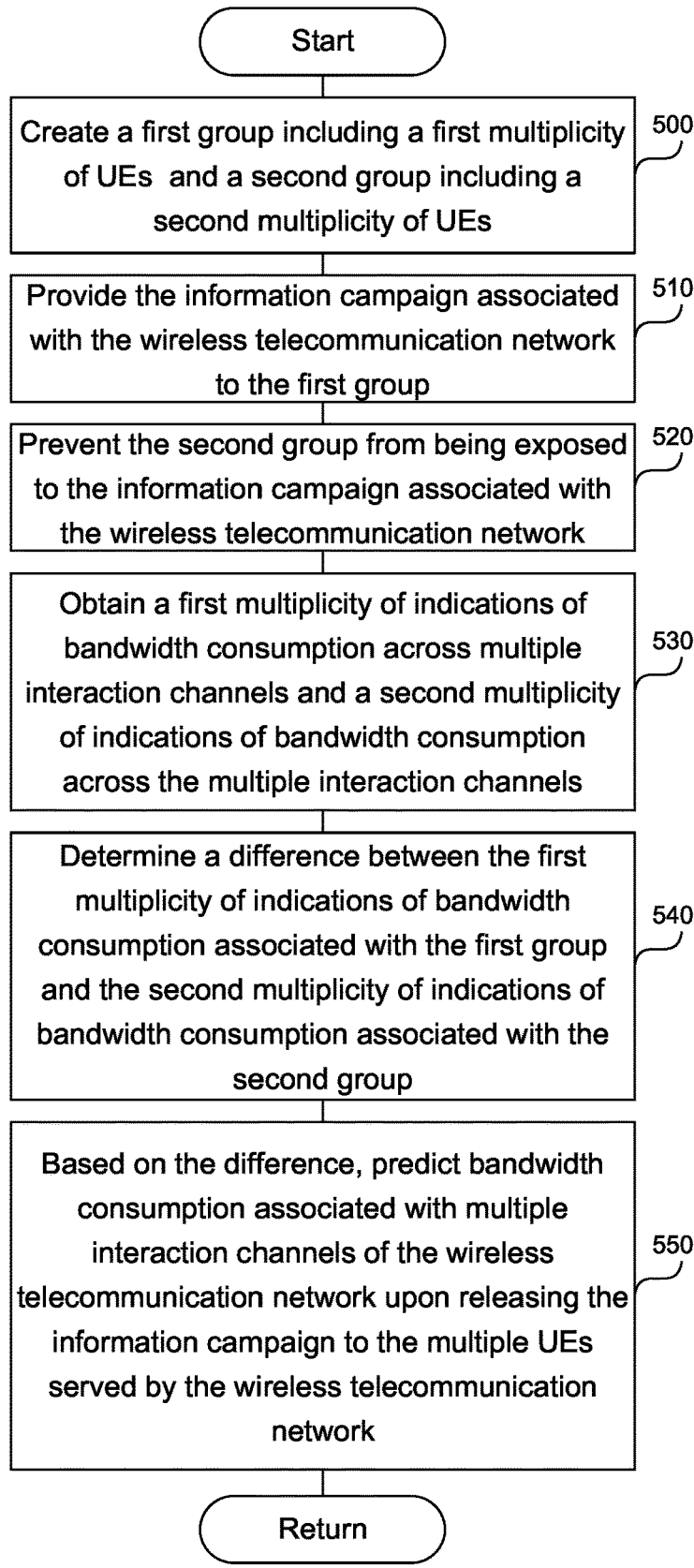
FIG. 5 is a flowchart of a method to predict bandwidth consumption associated with multiple interaction channels of a wireless telecommunication network upon releasing an information campaign associated with the wireless telecommunication network.

FIG. 5 is a flowchart of a method to predict bandwidth consumption associated with multiple interaction channels of a wireless telecommunication network upon releasing an information campaign associated with the wireless telecommunication network. A hardware or a software processor executing instructions described in this application can in step 500 create a first group including a first multiplicity of UEs associated with the wireless telecommunication network, and a second group including a second multiplicity of UEs associated with the wireless telecommunication network. The first multiplicity of UEs and the second multiplicity of UEs are a subset of multiple UEs operating on the wireless telecommunication network.

In step 510, the processor can provide the information campaign associated with the wireless telecommunication network to the first group. In step 520, the processor can prevent the second group from being exposed to the information campaign associated with the wireless telecommunication network.

In step 530, the processor can obtain a first multiplicity of indications of resource consumption, e.g. network resource consumption such as bandwidth consumption across the multiple interaction channels associated with the wireless telecommunication network. The processor can obtain a second parameters across the multiple interaction channels associated with the wireless telecommunication network. The first parameters are associated with the first group, and the second parameters are associated with the second group.

In step 540, the processor can determine a difference between the first parameters associated with the first group and the second parameters associated with the second group.

In step 550, based on the difference, the processor can predict bandwidth consumption associated with multiple interaction n channels of the wireless telecommunication network upon releasing the information campaign to the multiple UEs operating on the wireless telecommunication network.

The processor can obtain a first multiplicity of unique IDs associated with the first multiplicity of UEs and a second multiplicity of unique IDs associated with the second multiplicity of UEs. The unique ID can be a BAN. The processor can obtain the first parameters across the multiple interaction channels and a second parameters across the multiple interaction channels. The first parameters across the multiple interaction channels includes the first unique ID associated with the first UE consuming bandwidth. The second parameters across the multiple interaction channels includes the second unique ID associated with the second UE consuming bandwidth. The processor can obtain multiple unique IDs associated with a third multiplicity of UEs, where the third multiplicity of UEs is engaged in a desired transaction, e.g., a sale, with the wireless telecommunication network. The processor can determine a first indication of a number of desired transactions associated with the first multiplicity of UEs and a second indication of a number of desired transactions associated with the second multiplicity of UEs by comparing the first multiplicity of unique IDs to the multiple unique IDs and the second multiplicity of unique IDs to the multiple unique IDs. The processor can determine an effectiveness of the information campaign by comparing the first indication of the number of desired transactions with the second indication of the number of desired transactions. To determine the effectiveness of the information campaign, the processor can determine whether the first multiplicity of UEs engaged in more desired transactions by a predetermined margin, such as 10% more desired transactions than the second multiplicity of UEs.

The processor can assign a unique ID to each information campaign, and can track multiple campaigns simultaneously. The processor can create a first unique ID associated with the information campaign and a second unique ID associated with a second information campaign. The processor can present the information campaign and the second information campaign to the same, overlapping, or different sets of UEs. Presenting of the information campaign and presenting of the second information campaign can overlap in time at least partially. The processor can assign the first unique ID to data associated with the information campaign including the first parameters and the second parameters. The processor can assign the second unique ID to data associated with the second information campaign including a third parameters and a fourth parameters. The processor can distinguish between the data associated with the information campaign and the data associated with the second information campaign based on the first unique ID and the second unique ID.

The processor can segment the information campaign into location ID, audience ID, and experience ID. The processor can use generative AI to generate the information campaign. Specifically, the processor can obtain multiple historical information campaigns, multiple historical location IDs, multiple historical audience IDs, and multiple historical experience IDs. The historical information campaign among the multiple historical information campaigns is associated with a historical location ID among the multiple historical location IDs, a historical audience ID among the multiple historical audience IDs, and a historical experience ID among the multiple historical experience IDs. The historical location ID indicates a geographic location associated with a UE participating in the historical information campaign. The historical audience ID includes information about the UE participating in the historical information campaign, a tenure of the UE on the wireless telecommunication network, or demographic information associated with a user of the UE participating in the historical information campaign. The demographic information can include age, gender, income, place of residence, etc. The historical experience ID indicates a successful historical audience ID for which the historical information campaign was successful. The processor can obtain a location ID associated with the information campaign, an audience ID associated with the information campaign, and an experience ID associated with the information campaign. The processor can use a generative AI to create a visual associated with the information campaign based on the location ID, the audience ID, the experience ID, multiple historical location IDs, multiple historical audience IDs, and multiple historical experience IDs. The visual can be a visual representation of information such as an image, video, text, etc.

The processor can obtain multiple historical information campaigns, multiple historical location IDs, multiple historical audience IDs, and multiple historical experience IDs. The processor can use AI to predict a location ID, an audience ID, and an experience ID associated with the information campaign based on the multiple historical information campaigns, the multiple historical location IDs, the multiple historical audience IDs, and the multiple historical experience IDs.

To obtain the first parameters, the processor does not have to present the information campaign to a subset of UEs and obtain their interaction information. Instead, the processor can predict behavior of prospective UEs by simulating UE behavior. Specifically, the processor can obtain an indication of historical behavior associated with the first group. The processor can simulate a behavior of the first group associated with the information campaign based on the indication of historical behavior associated with the first group, without providing the information campaign to the first group. Based on the simulation, the processor can predict the bandwidth consumption associated with multiple interaction channels of the wireless telecommunication network upon releasing the information campaign to the multiple UEs operating on the wireless telecommunication network.

The processor can obtain information from digital channels and nondigital channels separately and combine the independently obtained information. Specifically, the processor can obtain a first subset of the first parameters from a digital channel including web, software applications, and chat. The processor can obtain a second subset of the first parameters from an analog channel including retail, IVR, and telephone interaction. The processor can combine the first subset and the second subset to obtain the first parameters.

Computer System

Figure 6:
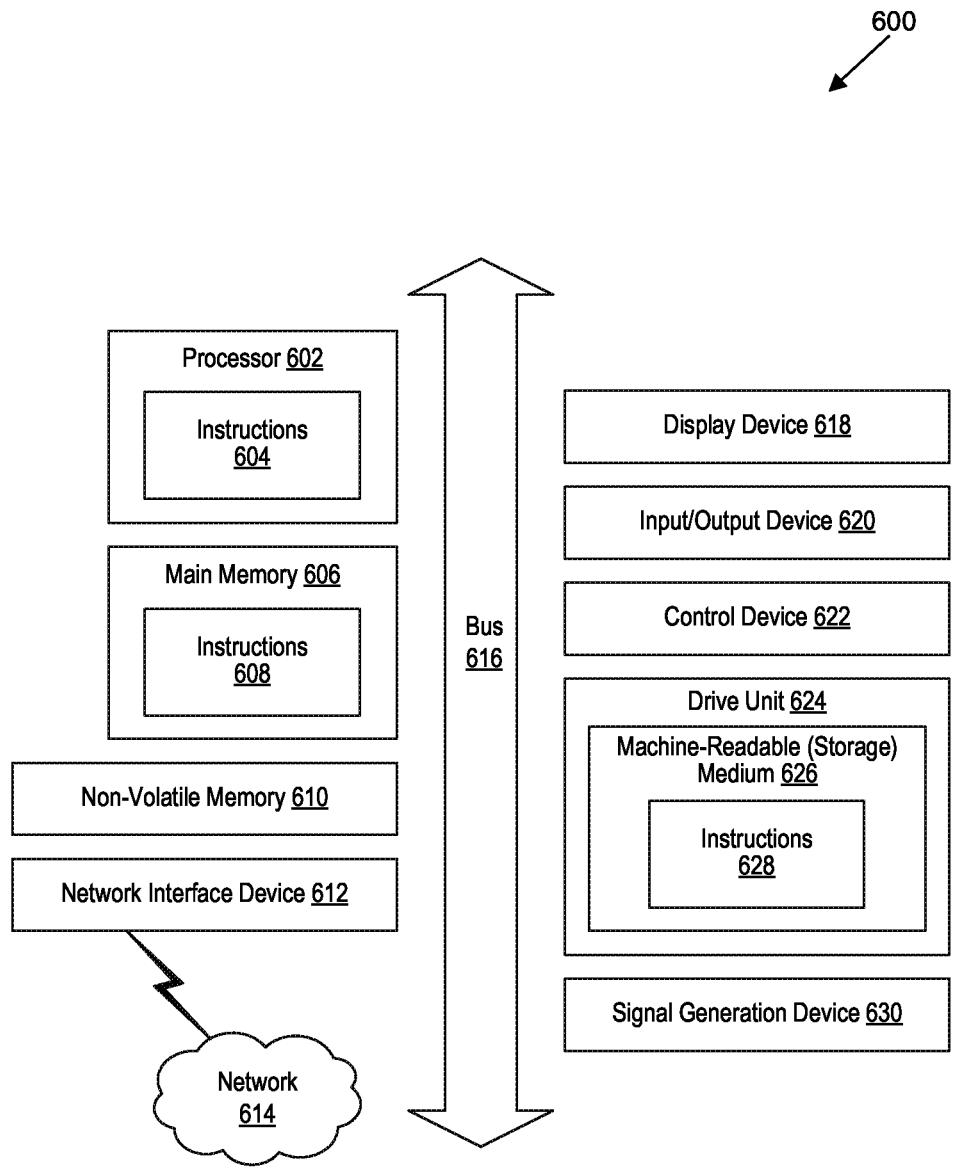
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or can include one or more cloud components in one or more networks. Where appropriate, one or more computer systems 600 can perform operations in real time, in near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon to predict bandwidth consumption associated with multiple interaction channels of a wireless telecommunication network upon releasing an information campaign associated with the wireless telecommunication network, wherein the instructions, when executed by at least one processor of a system of the wireless telecommunication network, cause the system to:
   create a first group including a first multiplicity of mobile devices associated with the wireless telecommunication network, and a second group including a second multiplicity of mobile devices associated with the wireless telecommunication network,
      wherein the first multiplicity of mobile devices and the second multiplicity of mobile devices are different subsets of multiple mobile devices operating on the wireless telecommunication network;
   provide the information campaign associated with the wireless telecommunication network to the first group;
   not provide the information campaign to the second group;
   obtain first parameters and second parameters across the multiple interaction channels associated with the wireless telecommunication network,
      wherein the first parameters are associated with the first group,
      wherein the second parameters are associated with the second group, and
      wherein the multiple interaction channels include a digital channel and an analog channel;
   determine a difference between the first parameters associated with the first group and the second parameters associated with the second group; and
   based on the difference, predict bandwidth consumption associated with the multiple interaction channels of the wireless telecommunication network upon releasing the information campaign to the multiple mobile devices operating on the wireless telecommunication network.

2. The non-transitory, computer-readable storage medium of claim 1, comprising instructions to:
   obtain a first multiplicity of unique identifiers (IDs) associated with the first multiplicity of mobile devices and a second multiplicity of unique IDs associated with the second multiplicity of mobile devices;
   obtain the first parameters across the multiple interaction channels and a second parameters across the multiple interaction channels,
      wherein the first parameters across the multiple interaction channels includes a first unique ID associated with a first mobile device consuming bandwidth,
      wherein the second parameters across the multiple interaction channels includes a second unique ID associated with a second mobile device consuming bandwidth;
   obtain multiple unique IDs associated with a third multiplicity of mobile devices,
      wherein the third multiplicity of mobile devices is engaged in a desired transaction with the wireless telecommunication network;
   determine a first indication of a number of desired transactions associated with the first multiplicity of mobile devices and a second indication of a number of desired transactions associated with the second multiplicity of mobile devices by comparing the first multiplicity of unique IDs to the multiple unique IDs and the second multiplicity of unique IDs to the multiple unique IDs; and
   determine an effectiveness of the information campaign by comparing the first indication of the number of desired transactions with the second indication of the number of desired transactions.

3. The non-transitory, computer-readable storage medium of claim 1, comprising instructions to:
   create a first unique ID associated with the information campaign and a second unique ID associated with a second information campaign;
   present the information campaign and the second information campaign,
      wherein the presenting of the information campaign and the presenting of the second information campaign overlap in time at least partially;
   assign the first unique ID to data associated with the information campaign including the first parameters and the second parameters;
   assign the second unique ID to data associated with the second information campaign including a third parameters and a fourth parameters; and
   distinguish between the data associated with the information campaign and the data associated with the second information campaign based on the first unique ID and the second unique ID.

4. The non-transitory, computer-readable storage medium of claim 1, comprising instructions to:
   obtain multiple historical information campaigns, multiple historical location IDs, multiple historical audience IDs, and multiple historical experience IDs,
      wherein a historical information campaign among the multiple historical information campaigns is associated with a historical location ID among the multiple historical location IDs, a historical audience ID among the multiple historical audience IDs, and a historical experience ID among the multiple historical experience IDs,
      wherein the historical location ID indicates a geographic location associated with a mobile device participating in the historical information campaign,
      wherein the historical audience ID includes information about the mobile device participating in the historical information campaign, a tenure of the mobile device on the wireless telecommunication network, or demographic information associated with a user of the mobile device participating in the historical information campaign,
wherein the historical experience ID indicates a successful historical audience ID for which the historical information campaign was successful;
obtain a location ID associated with the information campaign, an audience ID associated with the information campaign, and an experience ID associated with the information campaign; and
use a generative artificial intelligence (AI) to create a visual associated with the information campaign based on the location ID, the audience ID, the experience ID, the multiple historical location IDs, the multiple historical audience IDs, and the multiple historical experience IDs.

5. The non-transitory, computer-readable storage medium of claim 1, comprising instructions to:
obtain multiple historical information campaigns, multiple historical location IDs, multiple historical audience IDs, and multiple historical experience IDs,
wherein a historical information campaign among the multiple historical information campaigns is associated with a historical location ID among the multiple historical location IDs, a historical audience ID among the multiple historical audience IDs, and a historical experience ID among the multiple historical experience IDs,
wherein the historical location ID indicates a geographic location associated with a mobile device participating in the historical information campaign,
wherein the historical audience ID includes information about the mobile device participating in the historical information campaign, a tenure of the mobile device on the wireless telecommunication network, or demographic information associated with a user of the mobile device participating in the historical information campaign,
wherein the historical experience ID indicates a successful historical audience ID for which the historical information campaign was successful; and
use AI to predict a location ID, an audience ID, and an experience ID associated with the information campaign based on the multiple historical information campaigns, the multiple historical location IDs, the multiple historical audience IDs, and the multiple historical experience IDs.

6. The non-transitory, computer-readable storage medium of claim 1, wherein the instructions to obtain the first parameters comprise instructions to:
obtain an indication of historical behavior associated with the first group;
simulate a behavior of the first group associated with the information campaign based on the indication of historical behavior associated with the first group, without providing the information campaign to the first group; and
based on the simulation, predict the bandwidth consumption associated with the multiple interaction channels of the wireless telecommunication network upon releasing the information campaign to the multiple mobile devices operating on the wireless telecommunication network.

7. The non-transitory, computer-readable storage medium of claim 1, wherein the instructions to obtain the first parameters comprise instructions to:
obtain a first subset of the first parameters from the digital channel including web, software applications, and chat;
obtain a second subset of the first parameters from the analog channel, wherein the analog channel includes retail, interactive voice response (IVR), or telephone interaction; and
combine the first subset and the second subset to obtain the first parameters.

8. A method, comprising:
creating a first group including a first multiplicity of user equipment (UEs) associated with a wireless telecommunication network and a second group including a second multiplicity of UEs associated with the wireless telecommunication network,
wherein the first multiplicity of UEs and the second multiplicity of UEs are a subset of multiple UEs operating on the wireless telecommunication network;
providing an information campaign associated with the wireless telecommunication network to the first group;
not exposing the second group to the information campaign associated with the wireless telecommunication network;
obtaining a first multiplicity of indications of network resource consumption across multiple interaction channels associated with the wireless telecommunication network and a second multiplicity of indications across the multiple interaction channels associated with the wireless telecommunication network,
wherein the first multiplicity of indications of network resource consumption is associated with the first group,
wherein the second multiplicity of indications of network resource consumption is associated with the second group;
determining a difference between the first multiplicity of indications of network resource consumption associated with the first group and the second multiplicity of indications of network resource consumption associated with the second group; and
based on the difference, managing network resource consumption associated with the multiple interaction channels of the wireless telecommunication network upon releasing the information campaign to the multiple UEs operating on the wireless telecommunication network.

9. The method of claim 8, comprising:
obtaining a first multiplicity of unique identifiers (IDs) associated with the first multiplicity of UEs and a second multiplicity of unique IDs associated with the second multiplicity of UEs;
obtaining the first multiplicity of indications of network resource consumption across the multiple interaction channels and the second multiplicity of indications of network resource consumption across the multiple interaction channels,
wherein the first multiplicity of indications of network resource consumption across the multiple interaction channels includes a first unique ID associated with a first UE consuming network resource,
wherein the second multiplicity of indications of network resource consumption across the multiple interaction channels includes a second unique ID associated with a second UE consuming network resource;
obtaining multiple unique IDs associated with a third multiplicity of UEs,
wherein the third multiplicity of UEs is engaged in a desired transaction with the wireless telecommunication network;

determining a first indication of a number of desired transactions associated with the first multiplicity of UEs and a second indication of a number of desired transactions associated with the second multiplicity of UEs by comparing the first multiplicity of unique IDs to the multiple unique IDs and the second multiplicity of unique IDs to the multiple unique IDs; and determining an effectiveness of the information campaign by comparing the first indication of the number of desired transactions with the second indication of the number of desired transactions.

10. The method of claim 8, comprising:

creating a first unique ID associated with the information campaign and a second unique ID associated with a second information campaign;

presenting the information campaign and the second information campaign,
  wherein the presenting of the information campaign and the presenting of the second information campaign overlap in time at least partially;

assigning the first unique ID to data associated with the information campaign including the first multiplicity of indications of network resource consumption and the second multiplicity of indications of network resource consumption;

assigning the second unique ID to data associated with the second information campaign including a third multiplicity of indications of network resource consumption and a fourth multiplicity of indications of network resource consumption; and distinguishing between the data associated with the information campaign and the data associated with the second information campaign based on the first unique ID and the second unique ID.

11. The method of claim 8, comprising:

obtaining multiple historical information campaigns, multiple historical location IDs, multiple historical audience IDs, and multiple historical experience IDs,
  wherein a historical information campaign among the multiple historical information campaigns is associated with a historical location ID among the multiple historical location IDs, a historical audience ID among the multiple historical audience IDs, and a historical experience ID among the multiple historical experience IDs,
  wherein the historical location ID indicates a geographic location associated with a UE participating in the historical information campaign,
  wherein the historical audience ID includes information about the UE participating in the historical information campaign, a tenure of the UE on the wireless telecommunication network, or demographic information associated with a user of the UE participating in the historical information campaign,
  wherein the historical experience ID indicates a successful historical audience ID for which the historical information campaign was successful;

obtaining a location ID associated with the information campaign, an audience ID associated with the information campaign, and an experience ID associated with the information campaign; and using a generative artificial intelligence (AI) to create a visual associated with the information campaign based on the location ID, the audience ID, the experience ID, the multiple historical location IDs, the multiple historical audience IDs, and the multiple historical experience IDs.

12. The method of claim 8, comprising:

obtaining multiple historical information campaigns, multiple historical location IDs, multiple historical audience IDs, and multiple historical experience IDs,
  wherein a historical information campaign among the multiple historical information campaigns is associated with a historical location ID among the multiple historical location IDs, a historical audience ID among the multiple historical audience IDs, and a historical experience ID among the multiple historical experience IDs,
  wherein the historical location ID indicates a geographic location associated with a UE participating in the historical information campaign,
  wherein the historical audience ID includes information about the UE participating in the historical information campaign, a tenure of the UE on the wireless s telecommunication network, or demographic information associated with a user of the UE participating in the historical information campaign,
  wherein the historical experience ID indicates a successful historical audience ID for which the historical information campaign was successful; and using AI to predict a location ID, an audience ID, and an experience ID associated with the information campaign based on the multiple historical information campaigns, the multiple historical location IDs, the multiple historical audience IDs, and the multiple historical experience IDs.

13. The method of claim 8, wherein obtaining the first multiplicity of indications of network resource consumption comprises:

obtaining an indication of historical behavior associated with the first group;

simulating a behavior of the first group associated with the information campaign based on the indication of historical behavior associated with the first group, without providing the information campaign to the first group; and based on the simulation, predicting the network resource consumption associated with the multiple interaction channels of the wireless telecommunication network upon releasing the information campaign to the multiple UEs operating on the wireless telecommunication network.

14. A system comprising:

at least one hardware processor; and at least one non-transitory memory storing instructions, which, when executed by the at least one hardware processor, cause the system to:
  create a first group including a first multiplicity of UEs associated with a wireless telecommunication network and a second group including a second multiplicity of UEs associated with the wireless telecommunication network,
    wherein the first multiplicity of UEs and the second multiplicity of UEs are a subset of multiple UEs operating on the wireless telecommunication network;
  provide an information campaign associated with the wireless telecommunication network to the first group, but not provide to the second group the information campaign;
  obtain first parameters related to multiple interaction channels associated with the wireless telecommunication network, obtain second parameters related to the multiple interaction channels associated with the wireless telecommunication network,
  wherein the first parameters are associated with the first group, and
  wherein the second parameters are associated with the second group;
compare the first parameters with the second parameters; and
based on the comparison, manage resources associated with the multiple interaction channels of the wireless telecommunication network upon releasing the information campaign to the multiple UEs operating on the wireless telecommunication network.

15. The system of claim 14, comprising instructions to:
obtain a first multiplicity of unique identifiers (IDs) associated with the first multiplicity of UEs and a second multiplicity of unique IDs associated with the second multiplicity of UEs;
obtain the first parameters across the multiple interaction channels and the second parameters across the multiple interaction channels,
  wherein the first parameters across the multiple interaction channels includes a first unique ID associated with a first UE consuming bandwidth,
  wherein the second parameters across the multiple interaction channels includes a second unique ID associated with a second UE consuming bandwidth;
obtain multiple unique IDs associated with a third multiplicity of UEs,
  wherein the third multiplicity of UEs is engaged in a desired transaction with the wireless telecommunication network;
determine a first indication of a number of desired transactions associated with the first multiplicity of UEs and a second indication of a number of desired transactions associated with the second multiplicity of UEs by comparing the first multiplicity of unique IDs to the multiple unique IDs and the second multiplicity of unique IDs to the multiple unique IDs; and
determine an effectiveness of the information campaign by comparing the first indication of the number of desired transactions with the second indication of the number of desired transactions.

16. The system of claim 14, comprising instructions to:
create a first unique ID associated with the information campaign and a second unique ID associated with a second information campaign;
present the information campaign and the second information campaign,
  wherein the presenting of the information campaign and the presenting of the second information campaign overlap in time at least partially;
assign the first unique ID to data associated with the information campaign including the first parameters and the second parameters;
assign the second unique ID to data associated with the second information campaign including a third parameters and a fourth parameters; and
distinguish between the data associated with the information campaign and the data associated with the second information campaign based on the first unique ID and the second unique ID.

17. The system of claim 14, comprising instructions to:
obtain multiple historical information campaigns, multiple historical location IDs, multiple historical audience IDs, and multiple historical experience IDs,
  wherein a historical information campaign among the multiple historical information campaigns is associated with a historical location ID among the multiple historical location IDs, a historical audience ID among the multiple historical audience IDs, and a historical experience ID among the multiple historical experience IDs,
  wherein the historical location ID indicates a geographic location associated with a UE participating in the historical information campaign,
  wherein the historical audience ID includes information about the UE participating in the historical information campaign, a tenure of the UE on the wireless telecommunication network, or demographic information associated with a user of the UE participating in the historical information campaign,
  wherein the historical experience ID indicates a successful historical audience ID for which the historical information campaign was successful;
obtain a location ID associated with the information campaign, an audience ID associated with the information campaign, and an experience ID associated with the information campaign; and
use a generative artificial intelligence (AI) to create a visual associated with the information campaign based on the location ID, the audience ID, the experience ID, the multiple historical location IDs, the multiple historical audience IDs, and the multiple historical experience IDs.

18. The system of claim 14, comprising instructions to:
obtain multiple historical information campaigns, multiple historical location IDs, multiple historical audience IDs, and multiple historical experience IDs,
  wherein a historical information campaign among the multiple historical information campaigns is associated with a historical location ID among the multiple historical location IDs, a historical audience ID among the multiple historical audience IDs, and a historical experience ID among the multiple historical experience IDs,
  wherein the historical location ID indicates a geographic location associated with a UE participating in the historical information campaign,
  wherein the historical audience ID includes information about the UE participating in the historical information campaign, a tenure of the UE on the wireless s telecommunication network, or demographic information associated with a user of the UE participating in the historical information campaign,
  wherein the historical experience ID indicates a successful historical audience ID for which the historical information campaign was successful; and
use AI to predict a location ID, an audience ID, and an experience ID associated with the information campaign based on the multiple historical information campaigns, the multiple historical location IDs, the multiple historical audience IDs, and the multiple historical experience IDs.

19. The system of claim 14, wherein the instructions to obtain the first parameters comprise instructions to:
obtain an indication of historical behavior associated with the first group;
simulate a behavior of the first group associated with the information campaign based on the indication of historical behavior associated with the first group, without providing the information campaign to the first group; and based on the simulation, manage the resources associated with the multiple interaction channels of the wireless telecommunication network upon releasing the information campaign to the multiple UEs operating on the wireless telecommunication network.

20. The system of claim 14, wherein the instructions to obtain the first parameters comprise instructions to:
   obtain a first subset of the first parameters from a digital channel including web, software applications, and chat;
   obtain a second subset of the first parameters from an analog channel including retail, interactive voice response (IVR), and telephone interaction; and
   combine the first subset and the second subset to obtain the first parameters.

* * * * *